United States Patent [19]

Sato et al.

[11] 3,873,894

[45] Mar. 25, 1975

[54] POWER SUPPLY CONTROL SYSTEM

[75] Inventors: Tadashi Sato, Yono; Hisao Okada, Yokohama, both of Japan

[73] Assignee: Sony Corporation, Tokyo, Japan

[22] Filed: Sept. 18, 1973

[21] Appl. No.: 398,413

Related U.S. Application Data

[63] Continuation-in-part of Ser. No. 374,863, June 29, 1973.

[30] Foreign Application Priority Data

July 6, 1972   Japan.............................. 47-79886

[52] U.S. Cl. ............................................ 317/148.5
[51] Int. Cl. ............................................ H01h 47/32
[58] Field of Search............ 317/DIG. 8, 123, 148.5, 317/157

[56] References Cited
UNITED STATES PATENTS 2,971,137   2/1961   Stewart, Jr..................... 317/DIG. 8
3,162,790   12/1964   Wakamatsu .................... 317/DIG. 8
3,235,749   2/1966   Pokrant .......................... 317/DIG. 8

*Primary Examiner*—L. T. Hix
*Attorney, Agent, or Firm*—Lewis H. Eslinger; Alvin Sinderbrand

[57]   ABSTRACT

A circuit for manually and remotely controlling a power supply for an electric apparatus. A remotely controllable power switch is provided for the electric apparatus and is controlled by a relay which is driven by a flip-flop circuit taking first and second states alternately in response to separate remote control signals. A manually controllable power switch is also provided and is connected in series with a predetermined one of switching elements of the flip-flop circuit. As a result, the power supply to the electric apparatus can be controlled by the manually controllable power switch independently of the remotely controllable power switch.

6 Claims, 4 Drawing Figures

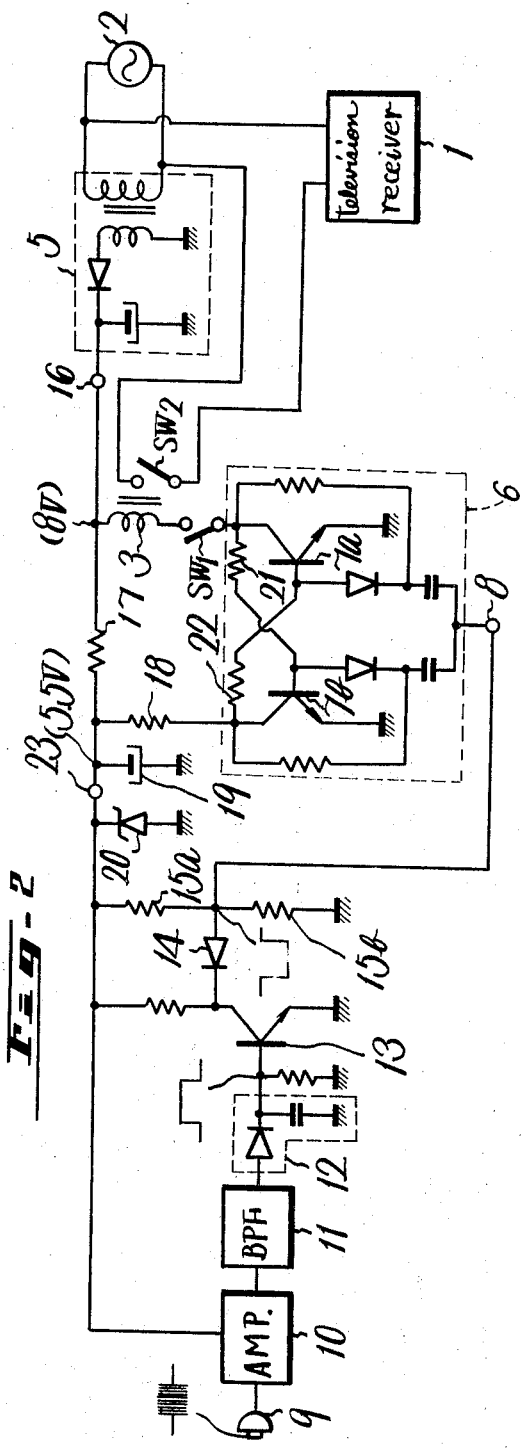
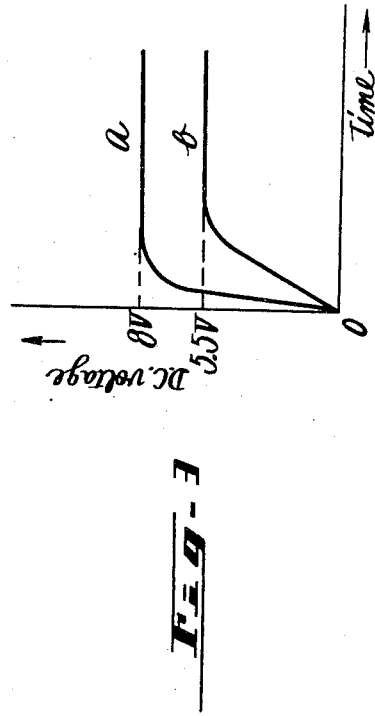
Fig-2
Fig-1

3,873,894

POWER SUPPLY CONTROL SYSTEM

CROSS-REFERENCE TO RELATED APPLICATION

This application is a continuation-in-part of copending application Ser. No. 374,863, filed June 29, 1973, of which the applicants are joint inventors.

BACKGROUND OF THE INVENTION

This invention relates generally to a power supply control system and more particularly to a system for manually and remotely controlling the power supply of an electric apparatus.

In one type of prior art power supply control system a manually controllable power switch and a remotely controllable power switch are connected in series between an electric power source and an electric apparatus which is to be remotely controlled. Since the manually and remotely controllable power switches are thus connected in series, when the remotely controllable power switch is in an OFF state, for example, even though the manually controllable power switch is turned ON the electric apparatus can not be supplied with the AC voltage. Accordingly the prior art power supply control system has the disadvantage that when an electric apparatus is turned OFF by means of a remote control signal it may not be ON again except with the remote control signal. This is especially disadvantageous in the case where the remote control signal transmitter (e.g. a T.V. remote control unit) is misplaced after the electric apparatus (e.g. the T.V.) has been turned OFF by a remote control signal. In such a case it is not possible to turn the electric apparatus ON again. Further, in the case where a flip-flop circuit is employed for driving the remotely controllable power switch, a failure of the power supply line will sometimes cause the remotely controllable power switch to be undesirably turned ON.

SUMMARY OF THE INVENTION

An improved power supply control system in accordance with the invention overcomes the disadvantages of the above described prior art system and is comprised of a power switch remotely controlled by a relay driven by a flip-flop circuit. The flip-flop circuit takes first and second states alternately in response to each remote control signal supplied from an external transmitter. A manually controllable power switch is connected in series to one of the pair of switching elements included in the flip-flop circuit to thereby control the power supply of an electric apparatus independently of the remotely controllable power switch.

Accordingly, it is an object of this invention to provide an improved power supply control system which can be controlled manually and remotely.

It is another object of this invention to provide an improved power supply control system in which an electric apparatus can be turned on by a manually controllable power switch even when the electric apparatus has been previously turned off by a remotely controllable power switch.

It is a further object of this invention to provide a remote control system for power supply which may be prevented from misoperation caused by failures in an electric power source.

The foregoing and other objectives, features, and advantages of the invention will be more readily understood upon consideration of the following detailed description of certain preferred embodiments of the invention, taken in conjunction with the accompanying drawings.

BRIEF DESCRIPTION OF THE DRAWINGS

FIG. 2 is a schematic diagram of one embodiment of a power supply control system according to the invention;

FIG. 3 is a graph for use in explaining the embodiment of FIG. 2; and

DESCRIPTION OF THE PREFERRED EMBODIMENTS

Figure 1:
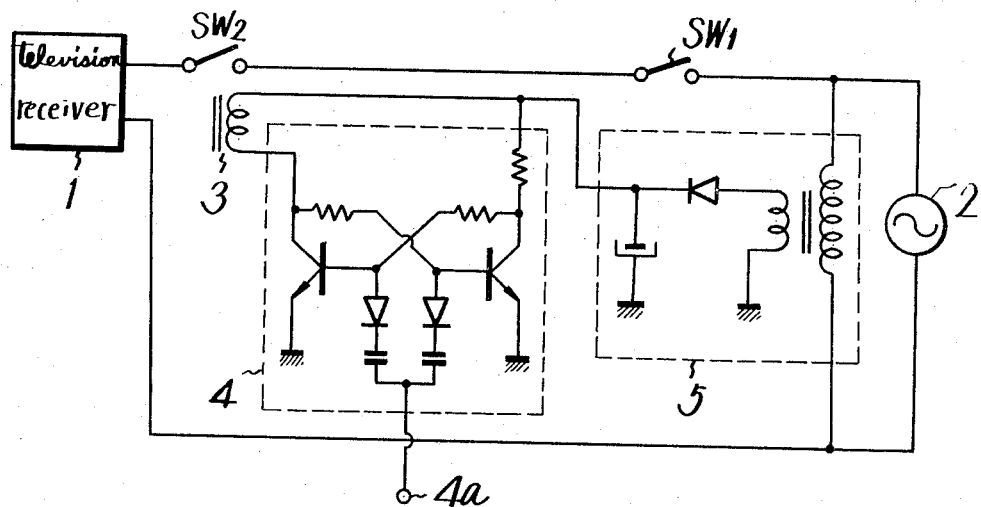
FIG. 1 is a schematic diagram of a prior art power supply control system.

Referring now more particularly to FIG. 1, a prior art remote control system for a power supply is constructed as shown in FIG. 1. An AC voltage is supplied from a power source 2 to an electric apparatus such as a television receiver 1 or the like through a manually controllable power switch $SW_1$ connected in series with a remotely controllable power switch $SW_2$. The remotely controllable power switch $SW_2$ is formed of a pair of contacts of a relay 3 and is turned ON when a sufficient current flows through a winding of the relay 3. The relay 3 is controlled by an output of a flip-flop control circuit 4.

The AC voltage from the power source 2 is transformed, rectified and smoothed by a DC power circuit 5 to produce a DC voltage. The DC power circuit is not described in detail since such circuits are known in the art. The DC voltage thus derived from the DC power circuit 5 is supplied to the relay 3 and the control circuit 4. The control circuit 4 is controlled by a remote control triggering signal fed to a remote control signal input terminal $4a$ so that the remotely controllable power switch $SW_2$ is alternately turned ON and OFF in response to every remote control signal supplied thereto. The remote control signal is typically supplied from a remote transmitter (not shown) in the form of ultrasonic sound signals.

The manually controllable power switch $SW_1$ is first turned ON to supply the AC voltage from the power source 2 to the television receiver 1. If the remotely controllable power switch $SW_2$ is in an ON state, the AC voltage can be immediately supplied to the television receiver 1, however, if the remotely controllable power switch $SW_2$ is in an OFF state, a remote control signal must be fed to the remote control signal input terminal $4a$ to trigger the flip-flop control circuit 4 to thereby turn the remotely controllable power switch $SW_2$ to an ON state and supply the AC voltage to the television receiver 1. With such a prior art system, however, there are disadvantages such as described above.

Now, let it be considered that the television receiver 1 is turned OFF by a remote control signal and the manually controllable power switch $SW_1$ is kept in the ON state. If the AC voltage at the source 2 (e.g. if the source 2 is a power supply line) momentarily becomes zero due to a power failure or the like and then recovers to its normal value, the DC power circuit 5 generates a transient voltage which is supplied to the control circuit 4 to reverse the state of the flip-flop circuit included in the control circuit 4. The reversing of the states of the flip-flop circuit may cause a current to flow through the winding of the relay 3 to undesirably turn the remotely controllable power switch $SW_2$ to an ON state. Such a misoperation is annoying and may even be very dangerous because it could cause a fire, especially if no one is present.

A description will next be given of a power supply control system according to the invention. Referring now more particularly to FIG. 2, a flip-flop circuit designated generally by reference numeral 6, including a pair of NPN type transistors $7a$ and $7b$, is triggered by a remote control signal which is supplied to a trigger terminal 8 from a remote control signal processing circuit which will be hereinbelow described.

An ultrasonic remote control signal transmitted from a remote control signal transmitter (not shown) is transduced by an ultrasonic microphone 9 the output of which is amplified by an amplifier 10. The amplified output therefrom is applied to a band-pass filter 11 to determine if a signal of a predetermined frequency is present. If such a signal is present it is detected by a detecting circuit 12 consisting of a diode and a capacitor. The output side of the detecting circuit 12 is connected to the base electrode of an NPN type transistor 13 whose collector electrode is connected to the cathode of a diode 14. The anode of the diode 14 is connected to the trigger terminal 8 of the flip-flop circuit 6. The anode of the diode 14 is also connected to a connection point of resistors $15a$ and $15b$ which are connected in series between a DC voltage input terminal 16 and the ground. The ultrasonic microphone 9, the amplifier 10, the band-pass filter 11, the detecting circuit 12, the transistor 13, the diode 14 and the resistors $15a$ and $15b$ comprise the aforementioned remote control signal processing circuit.

An AC voltage from a power source 2 is transformed, rectified and smoothed by a DC power circuit 5 to produce a DC voltage which is applied to a DC voltage input terminal 16. The DC voltage from the input terminal 16 is supplied to the remote control signal processing circuit and also to the flip-flop circuit 6. The collector of transistor $7b$ is connected to the base of transistor $7a$ through a resistor 22 and the collector of transistor $7a$ is connected to the base of the transistor $7b$ through a resistor 21. The emitters of both transistors $7a$ and $7b$ are grounded.

The DC voltage input terminal 16 is connected through a relay 3 in series with a manually controllable power switch $SW_1$ to the collector electrode of the transistor $7a$ which is one of the transistors of the flip-flop circuit 6. The input terminal 16 is also connected through series connected resistors 17 and 18 to the collector electrode of the other transistor $7b$ of the flip-flop circuit 6. The connection point 23 of the resistors 17 and 18 is grounded through a capacitor 19 and also grounded through a reverse biased Zener diode 20 having a Zener voltage of, for example, 5.5 volts. Further, relay contacts $SW_2$ are inserted between the AC power source 2 and a television receiver 1. The relay contacts $SW_2$ are adapted to be turned ON when the relay 3 is energized.

With the above described circuit of this invention, when the manually controllable power switch $SW_1$ is in an OFF state, the television receiver 1 is not connected with the AC power source 2 but the transistor $7a$ of the flip-flop circuit 6 has a DC bias voltage applied at its base electrode to make the transistor $7a$ ready to be conductive.

Under the above conditions, if the manually controllable power switch $SW_1$ is turned ON, the transistor $7a$ immediately becomes conductive to energize the relay 3 to turn the remotely controllable power switch $SW_2$ to an ON state, with the result that the television receiver 1 and the AC power source 2 are interconnected. Thus, if the switch $SW_1$ is turned ON, the television receiver 1 is surely and positively connected with the AC power source 2.

Furthermore, the remotely controllable condition is readied by turning the manually controllable power switch $SW_1$ to the ON state. That is, in the case where a remote control signal may be applied under the condition that the switch $SW_1$ is ON and the transistor $7a$ is conductive, a trigger pulse is supplied to the trigger terminal 8 of the flip-flop circuit 6 to reverse the state of the flip-flop circuit 6 with the result that the transistor $7a$ becomes non-conductive while the transistor $7b$ becomes conductive. Accordingly, the current is stopped from flowing through the winding of the relay 3 to thereby turn the remotely controllable power switch $SW_2$ to an OFF state. The television receiver 1 is thus thereafter not supplied with the AC voltage.

When a remote control signal is again supplied, the state of the flip-flop circuit 6 is again reversed to make the transistor $7a$ conductive and the transistor $7b$ non-conductive. As a result, the remotely controllable power switch $SW_2$ is turned ON to supply the AC voltage to the television receiver 1.

A description will hereinbelow be given of the operation of the flip-flop circuit 6 under the condition that a voltage on the power supply 2 momentarily becomes zero, by a power failure or the like, and then returns to its normal value. For purposes of this explanation it is assumed that the television receiver 1 has been turned OFF by means of a remote control signal, that is, the manually controllable power switch $SW_1$ is still in the ON state but the remotely controllable power switch $SW_2$ is in the OFF state. The resistor 18 is connected at one end with the time constant circuit consisting of the resistor 17 and the capacitor 19. Accordingly, with reference to FIG. 3, the rise time of the DC voltage at the connection point 16 of the DC power circuit 5 and the relay 3 during a transient state when the power supply voltage is being restored is faster as indicated by curve $a$ of FIG. 3 than the rise time of the DC voltage at the connection point 23 of the resistors 17 and 18 as indicated by $b$ thereof.

As a result, the rise time of the DC voltage applied to the base electrode of the transistor $7b$ through the relay 3, the manually controllable power switch $SW_1$, and the resistor 21 is faster than that of the DC voltage applied to the base electrode of the transistor $7a$ through the resistor 18 and the resistor 22. To this end, the transistor $7b$ of the flip-flop circuit 6 becomes positively conductive while the transistor $7a$ becomes non-conductive, with the result that the remotely controllable power switch $SW_2$ is kept in its OFF state to supply no AC voltage to the television receiver 1. In this case, the television receiver 1 will be supplied with the AC voltage by turning the manually controllable power switch $SW_1$ once to the OFF state and then to the ON state again.

In the above embodiment, the time constant circuit is provided with respect to the transistor $7b$ side in order to make the transistor $7b$ conductive first when the power supply is recovering. However, the same operation may be effected by making the flip-flop circuit 6 asymmetric without the provision of the time constant circuit. For example, in other embodiments the resistance value of the resistor 21 is selected to be smaller than that of the resistor 22 to thereby make the transistor 7b conductive first when the power supply is recovering.

According to the invention as described above, if the manually controllable power switch $SW_1$ is turned ON from the OFF state, the television receiver 1 can be supplied with the AC voltage independently of the remote control operation and hence the disadvantage of the prior art circuit can be avoided, that is the disadvantage is avoided that even with the switch $SW_1$ being turned ON the television receiver is applied with no AC voltage. Further, in the case where the power supply is cut off by a remote control signal and thereafter a power failure or the like occurs and is then restored, the television receiver will not be turned ON by mistake and hence no fire will occur when no one is in attendance.

Figure 4:
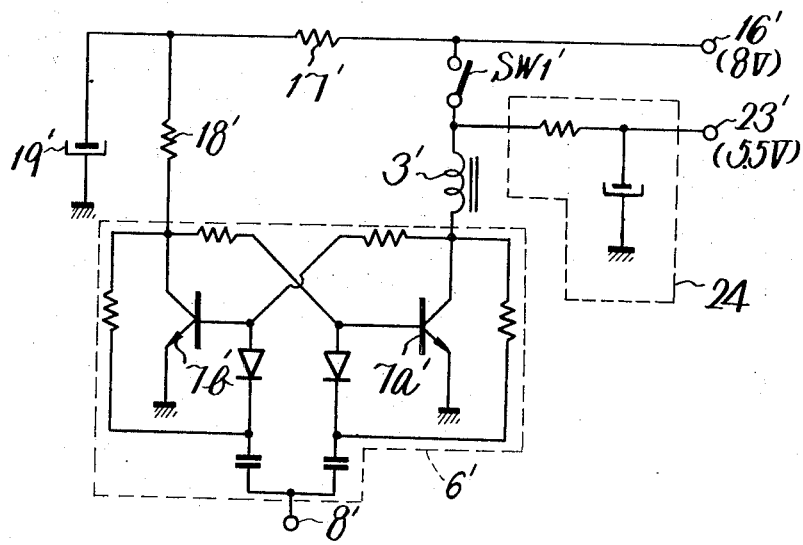
FIG. 4 is a partial schematic diagram of another embodiment of the invention.

FIG. 4 is a schematic diagram partially showing a modified embodiment of this invention. Similar elements are designated with corresponding primed reference numerals. In this case, a resistor-capacitor smoothing circuit 24 is connected at one end to the connection point between a manually controllable power switch $SW_1'$ and a relay 3' and at its other end to a DC voltage output terminal 23' from which the DC voltage is supplied to the remote control signal processing circuit. Further, a DC voltage input terminal 16' is connected to the collector electrode of a transistor 7b' of a flip-flop circuit 6' through a time constant circuit consisting of a resistor 17' and a grounded capacitor 19' and further through a resistor 18' connected to the collector of the transistor 7b'. In this embodiment there is the advantage that the power consumption of the remote control signal processing circuit is reduced. This is because the DC voltage is not supplied to the remote control signal processing circuit while the manually controllable power switch $SW_1$ is in an OFF state.

The terms and expressions which have been employed here are used as terms of description and not of limitation, and there is no intention in the use of such terms and expressions, of excluding equivalents of the features shown and described, or portions thereof, it being recognized that various modifications are possible within the scope of the invention claimed.

We claim as our invention:

1. A system for controlling the supply of electric power to an electric apparatus from an external power source, the system comprising, a bistable flip-flop circuit comprising first and second switching elements; circuit means connected to said switching elements to make said first switching element preferentially conductive upon the application of operating voltage to said flip-flop circuit; a remotely controllable power switch controlled by the flip-flop circuit, the electric power source being connected to the electric apparatus through the remotely controllable power switch; a remote control signal processing circuit for supplying a remote control triggering signal to the flip-flop circuit to thereby control the remotely controllable power switch; and a manually controllable power switch connected in series with said second switching element of the flip-flop circuit to control the supply of power to the electric apparatus independently of the remotely controllable power switch.

2. A power supply control system according to claim 1 wherein the remotely controllable power switch comprises a relay having a winding connected in series with said second switching element; and a pair of switching contacts.

3. A power supply control system according to claim 2 wherein the winding of the relay is connected in series with the manually controllable power switch.

4. A power supply control system according to claim 3 wherein an operating voltage for the remote control signal processing circuit is derived from a connection point of the manually controllable power switch and the winding of the relay.

5. A power supply control system according to claim 1 wherein the operating voltage for the flip-flop circuit and for the remote control signal processing circuit is derived from the electric power source.

6. A power supply control system according to claim 5 wherein said circuit means to make said first switching element preferentially conductive comprises a time constant circuit connected in series with said electric power source.

* * * * *